United States Patent
Kubota et al.

(10) Patent No.: US 6,945,452 B2
(45) Date of Patent: Sep. 20, 2005

(54) ELECTRONIC DEVICE, UNIT USING THE SAME, AND SYSTEM

(75) Inventors: Yoshiyasu Kubota, Kanagawa (JP); Katsuyuki Nakamura, Kanagawa (JP)

(73) Assignee: Sony Corporation (JP)

( * ) Notice: Subject to any disclaimer, the term of this patent is extended or adjusted under 35 U.S.C. 154(b) by 183 days.

(21) Appl. No.: 09/862,549

(22) Filed: May 22, 2001

(65) Prior Publication Data

US 2002/0013023 A1 Jan. 31, 2002

(30) Foreign Application Priority Data

May 26, 2000 (JP) .................................... P2000-157098

(51) Int. Cl.7 ............................................. G06F 17/00
(52) U.S. Cl. .............. 235/375; 235/132 R; 235/61 PD; 235/375; 235/380; 235/492
(58) Field of Search ............... 235/132 R, 380, 235/441, 381, 492, 375, 61 PD, 382, 383, 384, 385; 711/115; 710/301

(56) References Cited

U.S. PATENT DOCUMENTS

| | | | | |
|---|---|---|---|---|
| 4,368,519 A | * | 1/1983 | Kennedy | 702/61 |
| 5,451,755 A | * | 9/1995 | Duval et al. | 235/381 |
| 5,532,945 A | * | 7/1996 | Robinson | 713/321 |
| 5,600,566 A | * | 2/1997 | Park | 702/63 |
| 5,742,229 A | * | 4/1998 | Smith | 340/438 |
| 5,754,435 A | * | 5/1998 | Sato | 702/60 |
| 5,874,723 A | * | 2/1999 | Hasegawa et al. | 235/472.01 |
| 5,884,086 A | | 3/1999 | Amoni et al. | |
| 5,903,764 A | * | 5/1999 | Shyr et al. | 713/300 |
| 5,911,080 A | * | 6/1999 | Yeom | 713/300 |
| 5,964,879 A | * | 10/1999 | Dunstan et al. | 713/340 |
| 6,052,742 A | * | 4/2000 | Kirinaka et al. | 710/10 |
| 6,078,871 A | * | 6/2000 | Anderson | 702/63 |
| 6,081,205 A | * | 6/2000 | Williams | 340/932.2 |
| 6,134,666 A | | 10/2000 | De Nicolo | |
| 6,301,674 B1 | * | 10/2001 | Saito et al. | 713/340 |
| 6,442,699 B1 | * | 8/2002 | Nakajima | 713/320 |
| 6,459,175 B1 | * | 10/2002 | Potega | 307/149 |
| 6,609,072 B1 | * | 8/2003 | Yamagata | 702/64 |

* cited by examiner

Primary Examiner—Ahshik Kim
(74) Attorney, Agent, or Firm—Lerner, David, Littenberg, Krumholz & Mentlik, LLP (57) ABSTRACT

A main unit includes a file manager for inputting and outputting data files and an add-on driver for performing an extended function. The file manager and the add-on driver are connected to a first serial interface through respective protocol circuits. Input terminals of the first serial interface are connected to predetermined contacts of a connecting section, respectively. A power supply supplies power VCC and VSS to predetermined contacts in the connecting section. Data is exchanged with a register and a page buffer through a second serial interface provided in an electronic device. A read area at an arbitrary address in the register is used as an area in which a current value is written. A write area at the same address is used as an area in which a control signal is written. For example, a current suppliability bit and a function enabled bit are provided.

11 Claims, 6 Drawing Sheets

| ADDRESS | READ AREA | WRITE AREA |
|---|---|---|
| "00" | — | — |
| "01" | — | — |
| "02" | — | — |
| "03" | "00" ~ "FF" | |

FUNCTION (ENABLED/DISABLED)

CURRENT (PERMITTED/DENIED)

FIG. 5A

| ADDRESS | READ AREA | WRITE AREA |
|---|---|---|
| "00" | — | — |
| "01" | — | — |
| "02" | — | — |
| "03" | 0 1 0 0 0 0 0 1 | 0 0 0 0 0 0 0 0 |

FIG. 5B

| ADDRESS | READ AREA | WRITE AREA |
|---|---|---|
| "00" | — | — |
| "01" | — | — |
| "02" | — | — |
| "03" | 0 1 0 0 0 0 0 1 | 0 0 0 1 0 0 0 0 |

FIG. 5C

| ADDRESS | READ AREA | WRITE AREA |
|---|---|---|
| "00" | — | — |
| "01" | — | — |
| "02" | — | — |
| "03" | 0 1 0 0 0 0 0 1 | 0 0 0 1 0 0 0 1 |

FIG. 6

| COMBINATION OF FUNCTIONS | TOTAL CURRENT CONSUMPTION | CURRENT SUPPLY |
|---|---|---|
| MEMORY FUNCTION | 65 (mA) | PERMITTED |
| LAN CONNECTING FUNCTION | 120 (mA) | PERMITTED |
| COMMUNICATION FUNCTION | 70 (mA) | PERMITTED |
| MEMORY & LAN CONNECTING FUNCTIONS | 185 (mA) | DENIED |
| MEMORY & COMMUNICATION FUNCTIONS | 135 (mA) | PERMITTED |
| LAN CONNECTING & COMMUNICATION FUNCTIONS | 190 (mA) | DENIED |
| MEMORY, LAN CONNECTING, & COMMUNICATION FUNCTIONS | 255 (mA) | DENIED |

FIG. 7

ELECTRONIC DEVICE, UNIT USING THE SAME, AND SYSTEM

CROSS-REFERENCE TO RELATED APPLICATIONS

The present application claims priority from Japanese Application No. P2000-157098 filed May 26, 2000, the disclosure of which is hereby incorporated by reference herein.

BACKGROUND OF THE INVENTION

The present invention relates to electronic devices suitable for being used as, for example, devices which are removably provided with respect to a main unit in order to perform arbitrary functions, and to units using the same. More particularly, the present invention relates to an electronic device which has an equivalent shape to a memory card or a similar semiconductor memory and which is connected to a connecting section of a main unit in order to perform arbitrary functions, and to a unit using the same.

An electronic device is available which, for example, has an equivalent shape to a memory card which is removably provided with respect to a main unit or to a similar semiconductor memory. The electronic device is connected to a memory connecting section of the main unit in order to perform arbitrary functions. Specifically, such an electronic device adds on a connecting function for a computer network or a function of communicating with an external unit. In this way, the electronic device easily enhances the operation and application of the main unit.

Concerning such an electronic device, current consumption in executing a function greatly varies according to the type of function provided in the electronic device. Specifically, for example, when executing the above-described connecting function for a computer network or the function of communicating with an external unit, it requires a several-fold increase of current consumption compared with that required in executing a conventional memory function. When the electronic device which requires such a high current consumption is inserted into a main unit which is dedicated for electronic devices having the conventional memory function, an internal battery may be exhausted due to the excessive flow of current, or the function cannot be performed due to a decrease in the supply voltage. In the worst case, the main unit may be damaged.

In order to prevent these problems, the shape of the connecting section between the electronic device and the main unit is made different from that in which the electronic device is dedicated for the memory function. In this way, an electronic device having a different current consumption is not inserted into the main unit. However, such measures require a difficult process of reshaping the connecting section. When an electronic device having yet a larger current consumption is manufactured in the future, it will be necessary to again make the form of the connecting section different. In short, these measures do not lead to a fundamental solution.

The problems with the conventional electronic device and the main unit include the exhaustion of an internal battery in a short period of time due to the excessive flow of current when an electronic device having a different current consumption is inserted into the main unit and is used. A function may be disabled due to a reduction in the supply voltage, and, in the worst case, the main unit may be damaged. These problems cannot be solved by simply reshaping the connecting section in accordance with current consumption.

SUMMARY OF THE INVENTION

Accordingly, it is an object of the present invention to provide an electronic device provided with a register in which a necessary current consumption value for the electronic device is written so that a main unit reads the value in the register and supplies current to the electronic device in accordance with the read value. This enables the main unit to always supply current having a necessary current consumption value to the electronic device. A desired function provided in the electronic device is smoothly executed. Even when current consumption further increases, it is still possible to perform appropriate processing.

According to an aspect of the present invention, the foregoing objects are achieved through provision of an electronic device for performing an arbitrary function, the electronic device being removably connectable to a main unit for exchanging data with the main unit. The electronic device includes a register in which a current value of internally-consumed current is written. The electronic device is adapted to output the current value from the register to the main unit and to receive a driving current having the current value from the main unit.

In accordance with another aspect of the present invention, the foregoing objects are achieved through provision of a unit having an electronic device removably connectable thereto for exchanging data with the electronic device and for causing an arbitrary function of the electronic device to be executed. The unit includes a first reader operable to read from a register in the electronic device a current value of current consumed in the electronic device. A supply unit is operable to supply a driving current to the electronic device based on the current value read from the register.

According to the present invention, it is possible to always supply current having a necessary current consumption value to an electronic device, and hence a desired function provided in the electronic device can be smoothly performed. Even when current consumption increases, it is still possible to perform appropriate processing. Supply of a driving current and execution of a function are smoothly performed. Even when an electronic device is inserted into a main unit dedicated for electronic devices which only have a memory function in accordance with conventional specifications, unnecessary current does not flow. Accordingly, it is possible to prevent the consumption of an internal battery of the main unit in a short period of time due to the excessive flow of current, to prevent a function from being disabled due to a reduction in the supply voltage, and to prevent damage to the main unit, which may result in the worst case.

DETAILED DESCRIPTION

The present invention will become apparent from the following description of the preferred embodiments with reference to the accompanying drawings.

Figure 1:
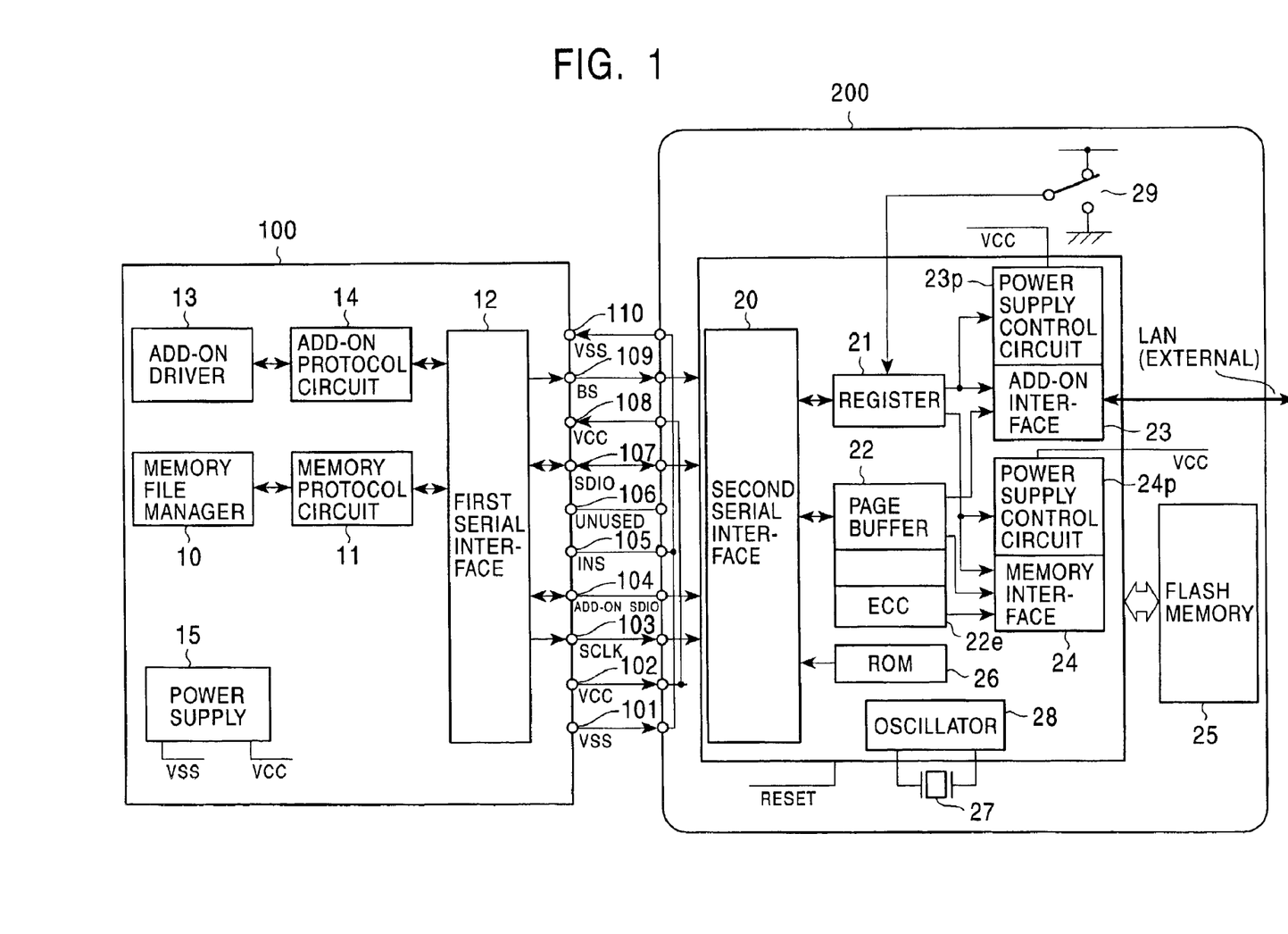
FIG. 1 is a block diagram of an electronic device and a main unit according to embodiments of the present invention.

FIG. 1 is a block diagram showing an electronic device according to an embodiment of the present invention and a main unit according to another embodiment of the present invention for using the electronic device. Referring to FIG. 1, a main unit 100 is illustrated at the left of the block diagram. The main unit 100 uses an electronic device 200. The main unit 100 includes a memory file manager 10 for inputting and outputting data files stored in a main memory (not shown) or the like. Data in the memory file manager 10 is exchanged with a first serial interface 12 through a memory communication protocol circuit 11. An add-on driver 13 for executing an arbitrary extended function is provided. Data in the add-on driver 13 is exchanged with the first serial interface 12 through an add-on communication protocol circuit 14.

Input/output terminals of the first serial interface 12 are connected to predetermined contacts of a connecting section, respectively. Power supply voltages VCC and VSS from a power supply 15 are connected to predetermined contacts of the connecting section. In other words, the connecting section is provided with, for example, ten contacts 101 to 110. From among the contacts 101 to 110, the power VSS is supplied to the contact 101, and the power VCC is supplied to the contact 102. A serial data clock (SCLK) from the first serial interface 12 is supplied to the contact 103.

Add-on serial data input/output (SDIO) from the first serial interface 12 is supplied to the contact 104. A terminal INS for detecting whether the electronic device 200 is connected is connected to the contact 105. The contact 106 is unused. Memory serial data input/output (SDIO) from the first serial interface 12 is supplied to the contact 107. The power VCC is supplied to the contact 108. A bus status output (BS) from the first serial interface 12 is supplied to the contact 109. The power VSS is supplied to the contact 110.

Figure 2:
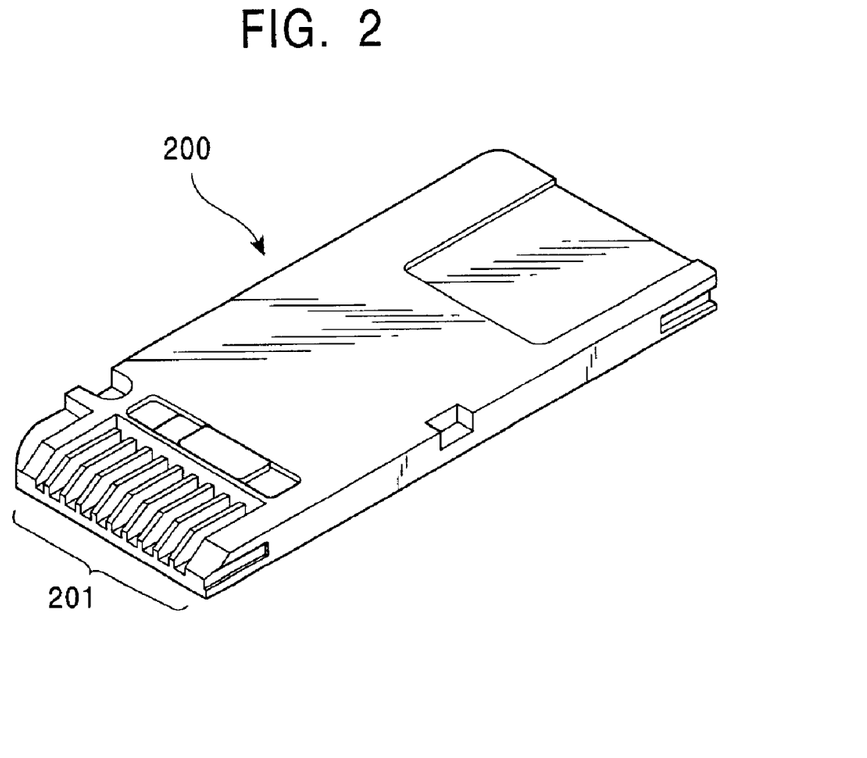
FIG. 2 is an external view of the electronic device of the embodiment.

The electronic device 200 is illustrated at the right side of the block diagram. The electronic device 200 has an equivalent shape to a so-called memory card or a semiconductor memory similar to the memory card. The electronic device 200 is removably provided with respect to the main unit 100. The electronic device 200 is electrically connected to the contacts 101 to 110 of the main unit 100 through a contact group 201 provided at the end of the electronic device 200. Thus, power can be supplied from the main unit 100 to the electronic device 200, and data can be exchanged between the main unit 100 and the electronic device 200.

Specifically, referring back to FIG. 1, data is exchanged between a second serial interface 20 provided in the electronic device 200 and the first serial interface 12 provided in the main unit 100. In addition, the second serial interface 20 exchanges data with a register 21 and a page buffer 22. An add-on interface 23 is connected to the page buffer 22, thereby exchanging data for executing a connecting function for a computer network (local area network (LAN)) or a communication function with an external unit.

A memory interface 24 is connected to the page buffer 22, thereby exchanging data for writing to and reading from, for example, a flash memory 25. Part of the page buffer 22 is provided with an error correcting code (ECC) circuit 22e for adding an ECC to data written in the flash memory 25. An ECC generated by the ECC circuit 22e is supplied to the memory interface 24, and the ECC and the data are written in the flash memory 25.

The electronic device 200 includes an attribute memory (ROM) 26. In the attribute memory 26, a version number of the electronic device 200 and default setting are stored. When the electronic device 200 is inserted into the main unit 100, the version number stored in the attribute memory 26 is read by the main unit 100. A command in accordance with the version number obtained by the main unit 100 initializes the electronic device 200. Accordingly, for example, a current consumption value in the electronic device 200 is written in a predetermined area of the register 21.

Figure 3:
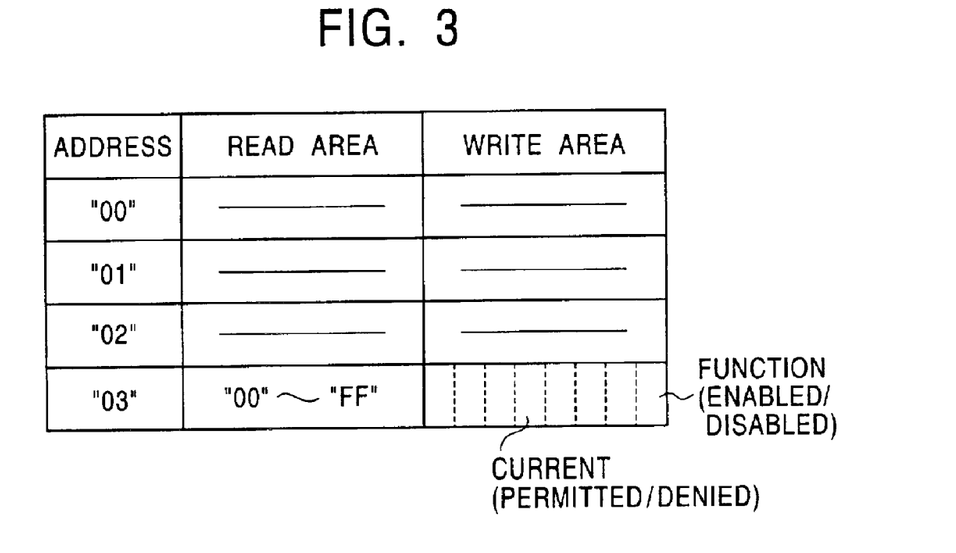
FIG. 3 is a table describing the electronic device.

Referring to FIG. 3, the register 21 includes a plurality of addresses. Each address includes, for example, an 8-bit read area and an 8-bit write area. For example, a read area at an address "03" (where "--" represents a hexadecimal value) is an area for writing a current value. For example, the current value is written using values "00" to "FF". A write area at the address "03" is an area for writing a control signal. For example, the fourth bit is a current suppliability bit (1: permitted and 0: denied), and the eighth bit is a function enabled bit (1: enabled and 0: disabled). Initial values and the like are written at the other addresses.

The electronic device 200 includes a crystal oscillator 27. A signal from the crystal oscillator 27 is supplied to an oscillator circuit 28, and the oscillator circuit 28 generates a clock signal for the internal operation. The clock signal is supplied to each circuit in the electronic device 200. A switch 29 prevents erroneous rewriting of data written in the flash memory 25. For example, when the power VCC is supplied to the electronic device 200, data writing is permitted. In contrast, when the electronic device 200 is connected to the ground side, data writing is prohibited. In this way, erroneous data writing is prevented.

Contacts at the electronic device 200 side, which correspond to the contacts 102 and 108 of the main unit 100 to which the power VCC is supplied, are connected to each other to form a power supply of the electronic device 200. Specifically, a mid-node of the contacts which correspond to the contacts 102 and 108 is connected to the power supply VCC of each circuit in the electronic device 200. The power VCC is supplied to the add-on interface 23 and the memory interface 24 through power supply control circuits 23p and 24p, respectively. The power supply control circuits 23p and 24p are controlled in accordance with a value written in the register 21.

Contacts at the electronic device 200 side, which correspond to the contacts 101 and 110 of the main unit 100 to which the power VSS is supplied, are connected to each other to form a ground of the electronic device 200. A contact which corresponds to the contact 105 is connected to the ground. In this state, an arbitrary potential is applied by the main unit 100 to the contact 105. When the electronic device 200 is inserted, the potential at the contact 105 becomes a ground potential. By detecting a change in the potential at the contact 105, the main unit 100 can determine whether the electronic device 200 is inserted.

Figure 4:
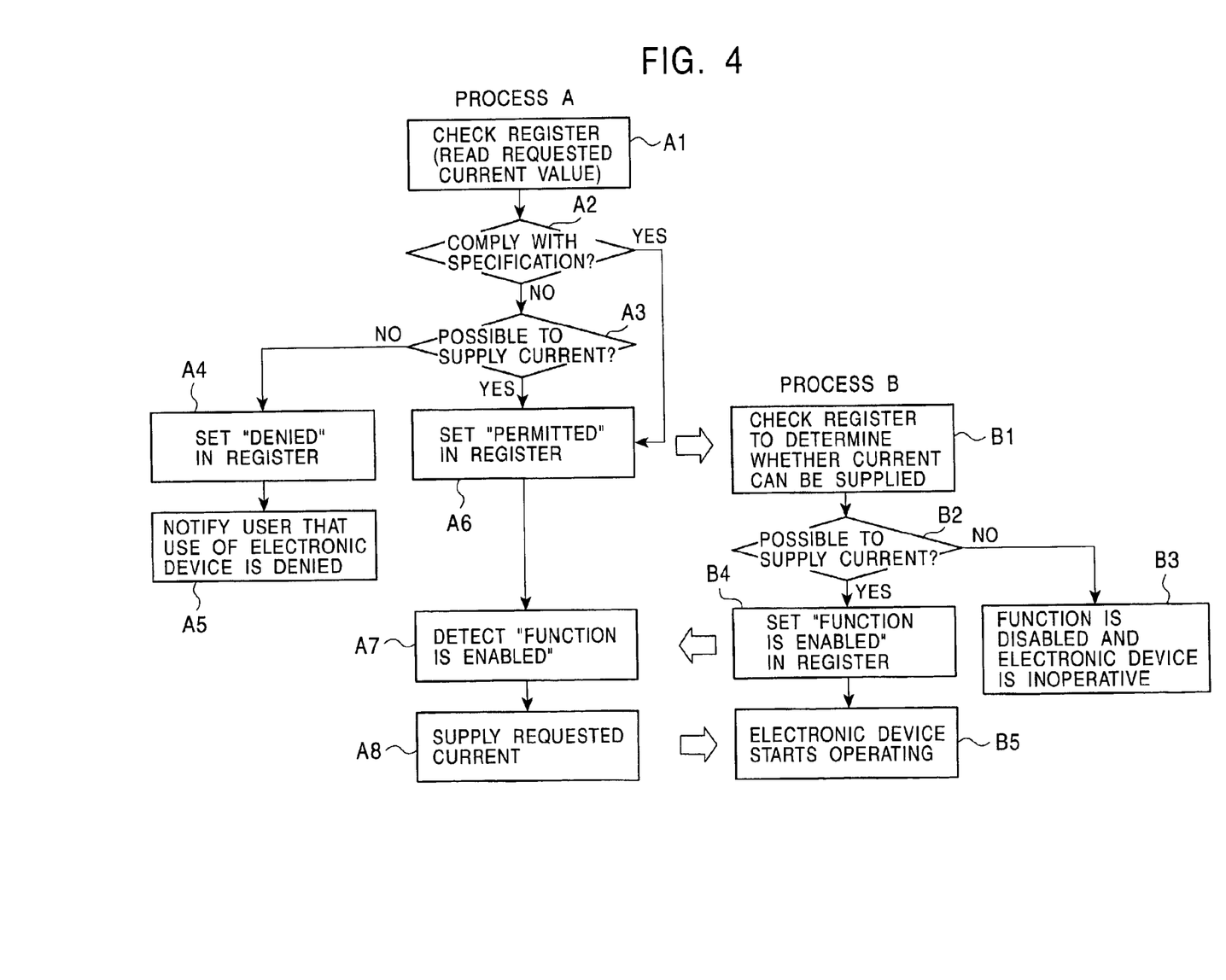
FIG. 4 is a flowchart showing the operation of the main unit and the electronic device.

FIG. 4 shows a case in which the electronic device 200 performs a single function. Specifically, FIG. 4 shows Process A performed by the main unit 100 and Process B performed by the electronic device 200, which are performed until the single function is activated. In step A1, Process A reads a current value written in the register 21 in the electronic device 200. In step A2, it is determined whether the current value complies with specifications for the main unit 100. If the determination is negative, Process A determines in step A3 whether it is possible to supply a current.

If the determination in step A3 is negative, Process A writes "power supply denied" (zero) in the fourth bit at the address "03" of the register 21 in the electronic device 200. In step A5, Process A notifies a user that the use of the electronic device 200 is denied. If it is determined in step A3 that it is possible to supply current, or if it is determined in step A2 that the current value complies with the specifications for the main unit 100, Process A writes, in step A6, "current supply permitted" (one) in the fourth bit at the address "03" of the register 21 in the electronic device 200.

In step B1, Process B in FIG. 4 reads the fourth bit at the address "03" of the register 21. In step B2, Process B determines whether it is possible to supply current based on the value in the fourth bit. In other words, when the value in the fourth bit is one, Process B determines that it is possible to supply current. When the value in the fourth bit is zero, Process B determines that it is impossible to supply current. When the determination in step B2 is negative, Process B maintains the eighth bit at the address "03" of the register 21 as zero (function is disabled), and the electronic device 200 is inoperative.

In contrast, when Process B determines in step B2 that it is possible to supply current, Process B writes, in step B4, "function is enabled" (one) in the eighth bit at the address "03" of the register 21. When Process A determines in step A7 that one is written in the eighth bit of the register 21 (function is enabled), Process A supplies, in step A8, a requested current in accordance with the current value read in step A1 to the contacts 102 and 108 to which the power VCC is supplied and to the contacts 101 and 110 to which the power VSS is supplied. In step B5, the electronic device 200 starts operating.

Figure 5A:
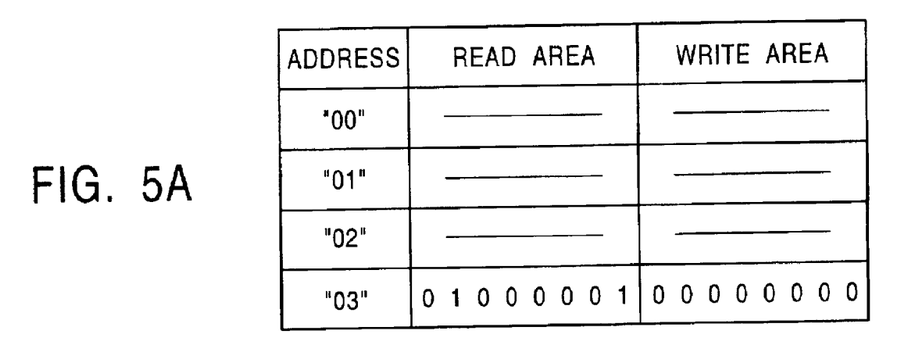
FIGS. 5A to 5C are tables describing the electronic device.
Figure 5B:
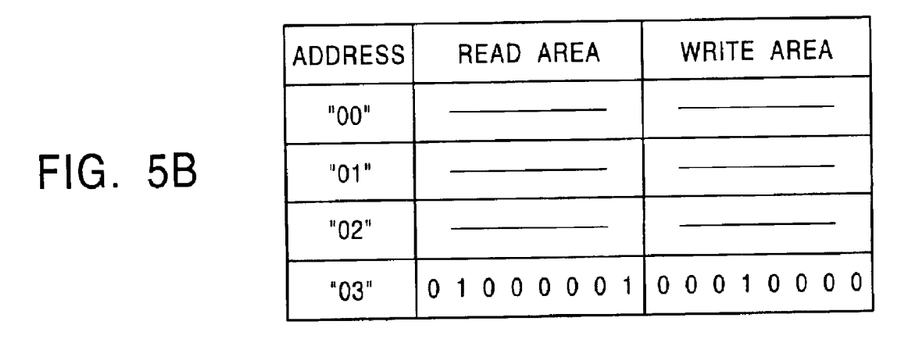
Figure 5C:
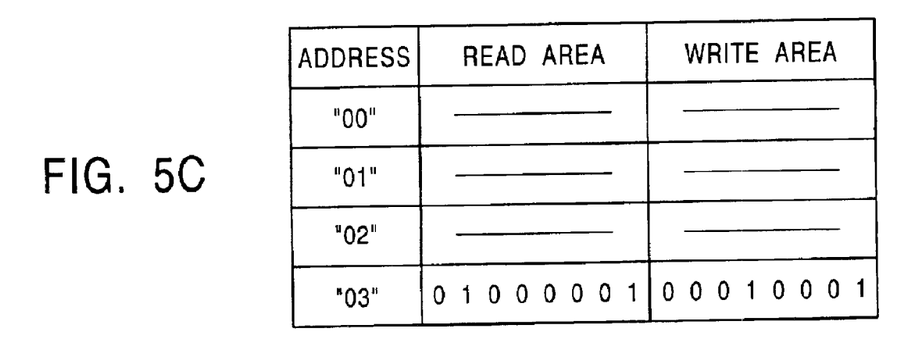

Referring to FIG. 5A, at the address "03" of the register 21, a current value requested by the electronic device 200 is written using a hexadecimal value in a read area. The value shown in FIG. 5A is "41"=65 mA. When the main unit 100 can supply a current having this current value, as shown in FIG. 5B, one is written in the current suppliability bit (fourth bit) of a write area. When the current suppliability bit is checked and the function is enabled, as shown in FIG. 5C, one is written in the function enabled bit (eighth bit) of the write area.

In this way, the current value requested by the electronic device 200 is detected by the main unit 100. When the current having the current value can be supplied from the main unit 100, the electronic device 200 starts executing the function. When the current having the current value cannot be supplied from the main unit 100, the function of the electronic device 200 is not executed. Accordingly, it is possible to prevent the consumption of an internal battery of the main unit 100 in a short period of time due to the excessive flow of current, to prevent a function from being disabled due to a reduction in the supply voltage, and to prevent damage to the main unit 100, which may result in the worst case.

Figure 6:
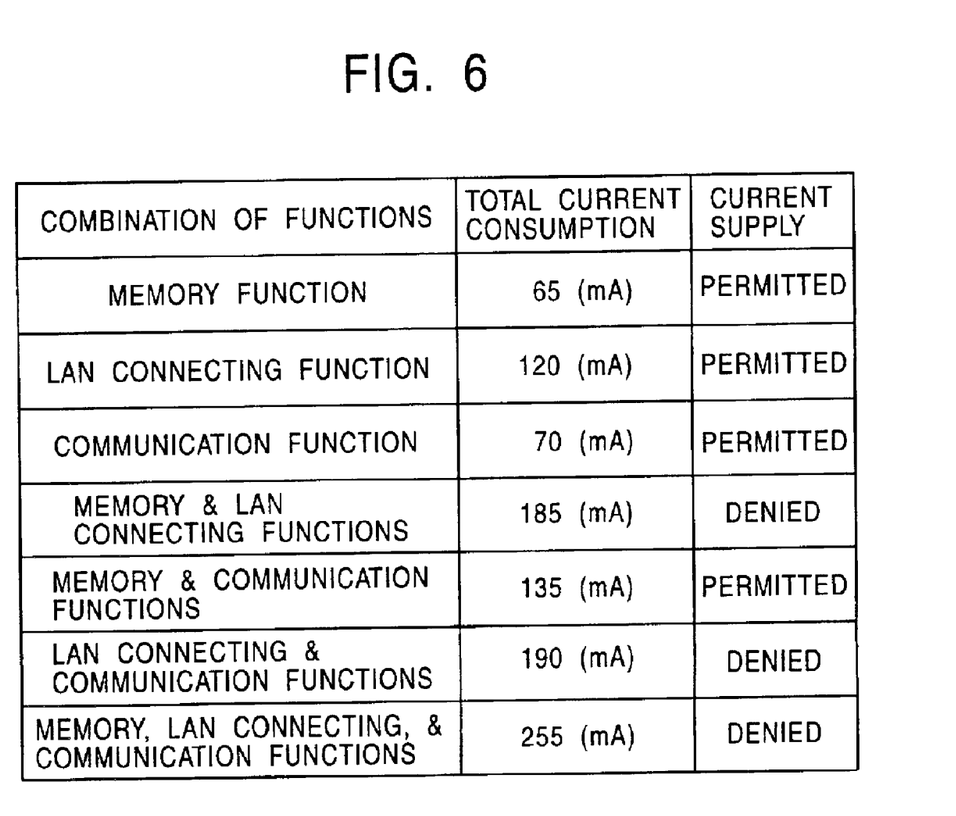
FIG. 6 is a table describing the electronic device.

In this embodiment, when the electronic device 200 includes a plurality of functions, a requested current consumption varies according to the combination of functions. Referring to FIG. 6, for example, a memory function, a LAN connecting function, and a communication function are provided. When each function is independently performed, current consumption is different for each function. When a combination of functions is performed, current consumption is different according to the combination. For example, when there are three types of functions, there are seven possible types of current consumption.

There are cases in which it is possible to supply current and cases in which it is impossible to supply current according to the combination of functions. As shown in FIG. 6, the memory function consumes a current of 65 mA. The LAN connecting function consumes a current of 120 mA. The communication function consumes a current of 70 mA. FIG. 6 shows current consumption by combinations of these functions. When the maximum current value is 150 mA, it is possible to supply current when each function is performed separately and when a combination of the memory function and the communication function are performed. When the other combinations of functions are performed, it is impossible to supply current.

Figure 7:
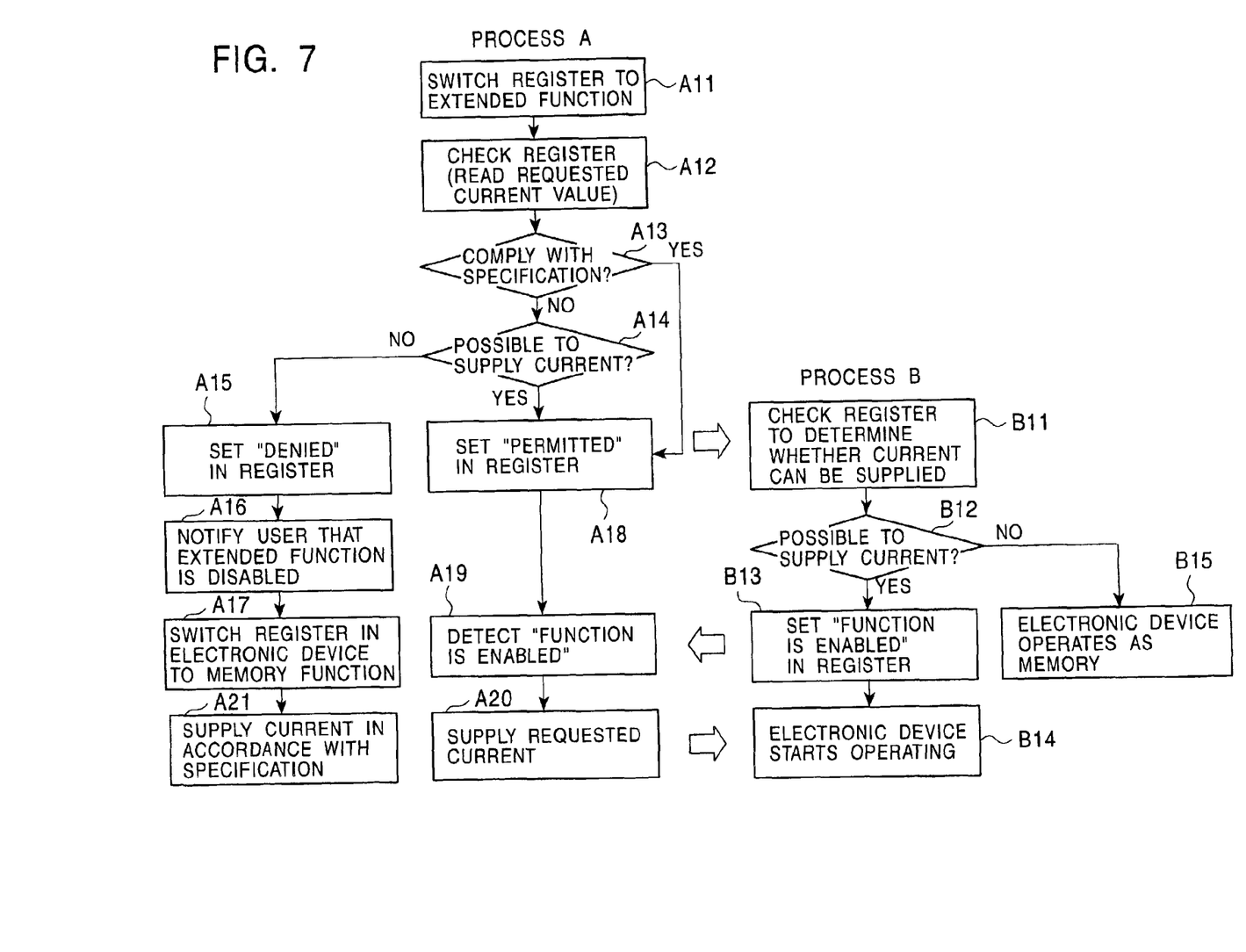
FIG. 7 is another flowchart showing the operation of the main unit and the electronic device.

FIG. 7 shows a case in which the electronic device 200 has a plurality of functions. Specifically, FIG. 7 shows Process A performed by the main unit 100 and Process B performed by the electronic device 200, which are performed until the functions of the electronic device 200 are activated. In step A11, Process A switches the register 21 to an extended function. In step A12, Process A reads a current value written in the register 21 in the electronic device 200. In step A13, Process A determines whether the current value complies with the specifications for the main unit 100.

When the determination in step A13 is negative, Process A determines, in step A14, whether it is possible to supply current. If the determination in step A14 is negative, Process A writes, in step A15, "current supply denied" (zero) in the fourth bit at the address "03" of the register 21 in the electronic device 200. In step A16, Process A notifies the user that the use of the extended function of the electronic device 200 is denied. In step A17, the main unit 100 switches the electronic device 200 so that the electronic device 200 performs only a memory function.

If Process A determines in step A14 that it is possible to supply current, or if Process A determines in step A13 that the current value complies with the specifications for the main unit 100, Process A writes, in step A18, "current supply permitted" (one) in the fourth bit at the address "03" of the register 21 in the electronic device 200. In step B11, Process B reads the fourth bit at the address "03" of the register 21. In step B12, Process B determines whether it is possible to supply current in accordance with the value written in the fourth bit. Specifically, when the value in the fourth bit is one, it is possible to supply current. When the value in the fourth bit is zero, it is impossible to supply current.

If Process B determines in step B12 that it is possible to supply current, Process B writes, in step B13, "function is enabled" (one) in the eighth bit at the address "03" of the register 21. When Process A determines, in step A19, that one is written in the eighth bit ("function is enabled"), Process A supplies, in step A20, a requested current in accordance with the current value read in step A12 to the contacts 102 and 108 and contacts 101 and 110. In step B14, the electronic device 200 starts operating.

When Process A determines in step A14 that it is impossible to supply current, Process A supplies, in step A21, a current in compliance with the specifications to the contacts 102 and 108 and to contacts 101 and 110. If Process B in step B12 determines that it is impossible to supply current, Process B maintains the eighth bit at the address "03" (the function is disabled). In step B15, only the memory function of the electronic device 200 is activated. Accordingly, when the main unit 100 cannot supply current, only the memory function of the electronic device 200 is activated.

When the main unit 100 determines the current value requested by the electronic device 200, and when the main unit 100 can supply a current having the requested current value, the functions of the electronic device 200 are activated. In contrast, when the main unit 100 cannot supply a current having the current value, only the function of the electronic device 200 that can be activated by the suppliable current is activated. In this way, it is possible to prevent the consumption of the internal battery of the main unit 100 in a short period of time due to the excessive flow of current, to prevent a function from being disabled due to a reduction in the supply voltage, and to prevent damage to the main unit 100, which may result in the worst case.

In this embodiment, a register is provided with a necessary current consumption value for an electronic device. A main unit reads the value in the register and supplies electrical current in accordance with the value to the electronic device. Accordingly, it is possible to always supply a current having a current consumption value, and hence a desired function provided in the electronic device is smoothly executed. Even when current consumption increases, it is still possible to perform appropriate processing.

Hitherto, when electronic devices with different current consumption values have been inserted into a main unit to be used, the internal battery may be exhausted in a short period of time due to the excessive flow of current. A function may be disabled due to a reduction in the supply voltage. In the worst case, damage may be caused to the main unit. In order to prevent these problems, the shape of the connecting section has been made different according to current consumption. However, these measures fail to solve the foregoing problems. According to the present invention, the problems encountered with the conventional electronic device and the main unit are easily solved.

In this embodiment, for example, when the value "00"=0 mA, which is an impossible value as a current consumption value, is written in the read area at the address "03" in the register 21, the value is not used as a current supply value. Instead, current supply in accordance with specifications is performed. In this way, when an electronic device which does not have the address "03" is inserted, current in compliance with specifications is supplied. It is therefore possible to use an electronic device according to conventional specifications without changing it. Hence, the compatibility with a conventional electronic device is ensured.

In this embodiment, for example, the contact 104 is used for the add-on serial data input/output (SDIO). In a conventional electronic device which only has a memory function in accordance with conventional specifications, the contact 104 is unused. In this case, the contact 104 is maintained at a high impedance until an arbitrary function is enabled. Only when the function is enabled does the contact 104 become conductive. In this way, when the electronic device is inserted into a main unit which is dedicated for electronic devices having a conventional memory function, unnecessary current may not be caused to flow.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An electronic device for performing a function, comprising:

a register having a region for storing a current consumption value indicating a current that is to be drawn by said electronic device from a main unit during execution of the function; and an interface configured for electrical connection to the main unit for outputting the current consumption value from said register for delivery to the main unit;

said register including a further region for storing permission information received from the main unit, the permission information indicating whether said electronic device is allowed to receive a driving current based on whether the current consumption value does not exceed a maximum driving current, and a still further region for storing function enablement information indicating whether the function is enabled or disabled, the function enablement information being set by said electronic device based on the permission information;

said interface receiving the driving current from the main unit based on the current consumption value when the function enablement information indicates that the function is enabled.

2. An electronic device according to claim 1, wherein said interface outputs the function enablement information from said register for delivery to the main unit prior to receiving the driving current from the main unit.

3. An electronic device according to claim 1, wherein the current consumption value stored by said register indicates the current that is to be drawn by said electronic device from the main unit during execution of a plurality of functions, and when the current consumption value exceeds the maximum driving current, said interface receives a driving current that is smaller than the requested current for carrying out only some of the plurality of functions.

4. An electronic device for performing a function, comprising:

a register having a region for storing a current consumption value indicating a current that is to be drawn by said electronic device from a main unit during execution of the function; and an interface configured for electrical connection to the main unit for outputting the current consumption value from said register for delivery to the main unit and for receiving a driving current based on the current consumption value from the main unit when the current consumption value does not exceed a maximum driving current for the main unit, said interface including a plurality of contacts for establishing the electrical connection with the main unit, one of said plurality of contacts being used only when the function is executed, said one contact being maintained at a high impedance until the function is enabled.

5. An electronic device for performing a function, comprising:

a memory for storing a version number;

an interface configured for electrical connection to a main unit for outputting the version number from said memory for delivery to the main unit when said electronic device is connected to the main unit and for receiving a current consumption value from the main unit, the current consumption value being based on the version number and indicating a current that is to be drawn by said electronic device from the main unit during execution of the function; and a register having a region for storing the current consumption value;

said interface outputting the current consumption value from said register for delivery to the main unit and receiving a driving current from the main unit based on the current consumption value when the current consumption value does not exceed a maximum driving current for the main unit.

6. A unit configured for connection to an electronic device, comprising:
   a first reader for reading a current consumption value from a register in the electronic device, the current consumption value indicating a current that is to be drawn by the electronic device from a supply unit of said unit during execution of a function of the electronic device;
   a writing unit for writing permission information in a register of the electronic device, the permission information indicating whether a driving current is allowed to be supplied to the electronic device based on whether the current consumption value does not exceed a maximum driving current; and
   a second reader for reading enablement information from the register of the electronic device, the enablement information indicating whether the function is enabled or disabled;
   said supply unit supplying the driving current to the electronic device based on the current consumption value when the enablement information indicates that the function is enabled.

7. A unit according to claim 6, wherein the current consumption value read by said first reader indicates the current that is to be drawn by the electronic device from said supply unit during execution of a plurality of functions, and when the current consumption value exceeds the maximum driving current, said supply unit supplies the electronic device with a driving current that is smaller than the requested current for carrying out only some of the plurality of functions.

8. A unit configured for connection to an electronic device, comprising:
   a writing unit for writing a current consumption value in a register of the electronic device based on a version number received from the electronic device when the electronic device is connected, the current consumption value indicating a driving current that is to be drawn by the electronic device from a supply unit of said writing unit during execution of a function of the electronic device; and
   a first reader for reading the current consumption value from the register in the electronic device;
   said supply unit supplying the driving current to the electronic device based on the current consumption value when the current consumption value does not exceed a maximum driving current.

9. A system, comprising:
   a main unit; and
   an electronic device for performing function, including:
   a register having a region for storing a current consumption value indicating a current that is to be drawn by said electronic device from said main unit during execution of the function, and
   an interface configured for connection to said main unit for outputting the current consumption value from said register for delivery to said main unit;
   said main unit including:
   a first reader for reading the current consumption value from said register, and
   a writing unit for writing permission information in said register of said electronic device, the permission information indicating whether a driving current is allowed to be supplied to said electronic device based on whether the current consumption value does not exceed a maximum driving current;
   said register of said electronic device including a further region for storing the permission information and a still further region for storing enablement information indicative of whether the function is enabled or disabled, the enablement information being set by said electronic device based on the permission information;
   said main unit including a second reader for reading the enablement information from said still further region of said register, and
   a supply unit for supplying the driving current to said electronic device based on the current consumption value when the enablement information indicates that the function is enabled.

10. A system according to claim 9, wherein the current consumption value read by said register of said electronic device indicates the current that is to be drawn by said electronic device from said main unit during execution of a plurality of functions, and when the current consumption value exceeds the maximum driving current, said supply unit of said main unit supplies said electronic device with a driving current that is smaller than the requested current for carrying out only some of the plurality of functions.

11. A system comprising:
    a main unit; and
    an electronic device for performing a function, said electronic device including:
    a memory for storing a version number, and
    an interface configured for connection to said main unit for outputting the version number from said memory for delivery to said main unit when said electronic device is connected to said main unit;
    said main unit including:
    a writing unit for writing a current consumption value in a region of a register of said electronic device based on the version number, the current consumption value indicating a current that is to be drawn by said electronic device from said main unit during execution of the function;
    a first reader for reading the current consumption value from said register, and
    a supply unit for supplying a driving current to said electronic device based on the current consumption value when the current consumption value does not exceed a maximum driving current for said main unit.

* * * * *

UNITED STATES PATENT AND TRADEMARK OFFICE
CERTIFICATE OF CORRECTION

PATENT NO.    : 6,945,452 B2
DATED         : September 20, 2005
INVENTOR(S)   : Yoshiyasu Kubota and Katsuyuki Nakamura It is certified that error appears in the above-identified patent and that said Letters Patent is hereby corrected as shown below:

<u>Column 9,</u>
Line 58, after "performing", insert -- a --.

Signed and Sealed this

Twenty-seventh Day of December, 2005

JON W. DUDAS
*Director of the United States Patent and Trademark Office*